United States Patent [19]
Blatz

[11] Patent Number: 5,277,864
[45] Date of Patent: Jan. 11, 1994

[54] TOUGHENED THERMOPLASTIC POLYESTER COMPOSITIONS

[75] Inventor: Philip S. Blatz, Wilmington, Del.

[73] Assignee: E. I. du Pont de Nemours and Company, Wilmington, Del.

[21] Appl. No.: 866,466

[22] Filed: Apr. 10, 1992

Related U.S. Application Data

[63] Continuation-in-part of Ser. No. 575,546, Aug. 27, 1990, abandoned.

[51] Int. Cl.$^5$ .................. B29C 45/46; B29C 49/00
[52] U.S. Cl. ......................... 264/328.17; 264/328.1; 264/328.8; 264/523; 264/537; 264/540; 525/176; 428/36.8
[58] Field of Search ............ 525/176; 428/36.8; 264/328.1, 328.17, 328.8, 523, 537, 540

[56] References Cited

U.S. PATENT DOCUMENTS

| | | |
|---|---|---|
| 4,172,859 | 10/1979 | Epstein . |
| 4,294,938 | 10/1981 | Berr et al. . |
| 4,303,573 | 12/1981 | Ostapchenko . |
| 4,506,043 | 3/1985 | Ogawa et al. . |
| 4,659,767 | 4/1987 | Dunkle et al. . |
| 4,693,941 | 9/1987 | Ostapchenko . |
| 4,753,980 | 6/1988 | Deyrup . |
| 4,771,108 | 9/1988 | Mackenzie . |
| 4,772,652 | 9/1988 | Yoshifumi et al. . |
| 4,801,649 | 1/1989 | Statz . |
| 4,914,156 | 4/1990 | Howe . |
| 5,019,459 | 2/1992 | Howe . |
| 5,115,012 | 5/1992 | Howe .................. 524/456 |
| 5,128,404 | 7/1992 | Howe .................. 524/456 |

*Primary Examiner*—Patricia A. Short

[57] ABSTRACT

Toughened semi-crystalline thermoplastic polyester molding compositions consisting essentially of a polyester resin and an ionomer of ethylene, a softening comonomer and unsaturated carboxylic acid, such as ethylene/n-butyl acrylate/methacrylic acid.

3 Claims, No Drawings

TOUGHENED THERMOPLASTIC POLYESTER COMPOSITIONS

CROSS REFERENCE TO RELATED APPLICATION

This application is a continuation-in-part of copending application Ser. No. 07/575,546, filed Aug. 27, 1990, now abandoned.

TECHNICAL FIELD

This invention relates to certain polyester molding compositions which contain a specific ionomer and which are characterized by extraordinary toughness.

BACKGROUND ART

U.S. Pat. No. 4,693,941, granted Sep. 15, 1987 to Ostapchenko, discloses PET compositions containing a small amount of a terpolymer of ethylene containing carboxyl groups which may be partly or completely neutralized to a divalent metal salt form, and a reinforcing filler, such as glass fibers. Example VII discloses an ethylene/n-butyl acrylate/methacrylic acid terpolymer. In addition, Ostapchenko requires a reinforcing filler to be present. Ostapchenko is concerned in producing sheets with his composition which are readily thermoformable and have good thermoforming radius ratios.

U.S. Pat. No. 4,172,859, granted Oct. 30, 1979 to B. N. Epstein, discloses multiphase thermoplastic molding compositions containing 60-99 weight percent of polyester matrix resin, and 1-40 weight percent of ionomer having a particle size in the range of 0.01-3.0 microns. The ionomer has a tensile modulus of less than 1/10th the tensile modulus of the matrix resin. Among the ionomers disclosed and exemplified by Epstein in such compositions are poly(ethylene/iso-butylacrylate/methacrylic acid) and poly(ethylene/methyl acrylate) both ionomers being neutralized with zinc. The homopolymer of the softening comonomers in these ionomers, namely iso-butyl and methyl, both have a glass temperature of of $-24°$ C. or higher. Such compositions are characterized as toughened as compared with unmodified polyester compositions. Epstein does not teach an ethylene/n-butyl acrylate/methacrylic acid neutralized with zinc. In addition, Epstein does not teach a specific glass transition temperature for the homopolymer of the softening comonomer within the ionomer.

U.S. Pat. No. 4,772,652, granted Sep. 20, 1988 to Yoshifumi et al., discloses a polyester resin composition comprising a copolyester, an ionomer used as a nucleating agent, and a reinforcing filler. These polyester resin compositions are characterized by toughness, impact strength and moldability.

U.S. Pat. No. 4,914,156, granted Apr. 3, 1990 to Howe, discloses a blow moldable polyester composition containing 85-95 parts by Weight of polyester, 5-15 parts by weight of an epoxide polymer, 0.01-3.0 parts by weight of an ionomer in particular a zinc ionomer of ethylene/methacrylic acid, and 0.1-3.0 parts by weight of a fibrillatable polytetrafluoroethylene resin.

U.S. Pat. No. 4,771,108, granted Sep. 13, 1988 to MacKenzie, discloses a flex-resistant oriented polyester film comprising a blend of polyethylene terephthalate (PET) resin, a polyolefin incompatible with the PET and an ionomer resin such as a partially neutralized ethylene/methacrylic co- or ter-polymer.

U.S. Pat. No. 4,753,980, granted Jun. 28, 1988 to Deyrup, discloses toughened thermoplastic polyester compositions comprising 60-97 weight percent of a polyester and 3-40 weight percent of an ethylene copolymer such as ethylene/methacrylate/glycidyl methacrylate.

U.S. Pat. No. 4,659,767, granted Apr. 21, 1987 to Dunkle et al., discloses an impact modified linear saturated polyester blend comprising 50-86 percent by weight of a linear saturated polyester and 14-50 percent by weight of an impact modifying amount of (1) an acrylate-containing core-shell polymer and (2) a copolymer of an $\alpha$-olefin having 2-8 carbon atoms and includes an ethylene/methacrylic acid copolymer neutralized with zinc.

U.S. Pat. No. 4,506,043, granted Mar. 19, 1985 to Ogawa et al, discloses a glass-reinforced thermoplastic polyester composition containing 100 parts by weight of PET, 5 to 200 parts by weight of glass fibers, 0.05 to 3 parts by weight of a mold release agent and an ionomer such as metal neutralized ethylene/ethyl acrylate/methacrylic acid.

U.S. Pat. No. 4,303,573, granted Dec. 1, 1981 to Ostapchenko, discloses a molding blend containing PET, an ionomeric terpolymer, such as, ethylene/iso-butyl acrylate/methacrylic acid neutralized with zinc and a second terpolymer.

U.S. Pat. No. 4,294,938, granted Oct. 13, 1981 to Berr et al., discloses a polyester molding composition containing PET, a reinforcing material, an ionomer such as ethylene/methacrylic acid copolymer neutralized with sodium and a silicon resin. These composition improve the heat aging resistance to oxidative discoloration of PET resins.

U.S. Pat. No. 4,801,649 granted Jan. 31, 1989 to Statz, discloses a thermoplastic blend of an ethylene/n-butyl acrylate/methacrylic acid neutralized with zinc and copolymer with material selected from the group consisting of nylon, polypropylene, propylene-ethylene copolymer, linear polyethylene, and ethylene/unsaturated carboxylic acid copolymer.

SUMMARY OF THE INVENTION

The present invention is characterized by extraordinary toughness of molded or extruded thermoplastic polyester compositions obtained from compounding a polyester resin with particular ionomers.

More specifically, the compositions of the present invention are semi-crystalline thermoplastic polyester molding compositions consisting essentially of the following components:

(a) from about 60-85 weight percent of polyester resin, and (b) from about 15-40 weight percent of ionomer of at least 55 weight percent ethylene, about 20-30 weight percent of softening comonomer, where the comonomer is an alkyl acrylate whose homopolymer glass transition temperature, Tg, is less than $-24°$ C., and about 5-15 weight percent of unsaturated carboxylic acid selected from the group consisting of acrylic acid, methacrylic acid, fumaric acid, itaconic acids, and half esters of maleic, fumaric and itaconic acids, and further wherein the ionomer having from about 20% to about 80% of the carboxylic acid groups neutralized with zinc, cobalt, nickel, aluminum or copper (II), provided the composition has a notched Izod impact strength by ASTM-D-256 at room temperature of at least 800 J/M.

Another embodiment of the present invention is a toughened multi-phase polyester composition prepared from the molding composition described above, wherein component (b) is dispersed throughout component (a) as separate particles having a number average particle size of less than 3 micrometers.

DETAILED DESCRIPTION OF THE INVENTION

The present invention is characterized by the extraordinary toughness of molded or extruded thermoplastic polyester compositions obtained from compounding a polyester resin with particular ionomers. The compositions may be precompounded mixtures or from physical mixtures of particles of polyester resin and ionomer. The particles may be in the form of flakes or molding granules but in any event have at least one dimension of at least 2 mm in length. The precompounded mixtures or physical mixtures may be melt fabricated by such processes as injection molding, injection blow molding, extrusion blow molding, or extrusion.

Preferred compositions of the present invention are semi-crystalline thermoplastic polyester moldable compositions consisting essentially of the following components:

(a) from about 70-85 weight percent of polyester resin, and (b) from about 15-30 weight percent of ionomer of at least 55 weight percent ethylene, about 20-30 weight percent of softening comonomer selected from the group consisting of n-butyl acrylates, 2-ethylhexyl acrylates and 2-methoxyethyl acrylates, and about 5-15 weight percent of unsaturated carboxylic acid selected from the group consisting of methacrylic acid and acrylic acid and further wherein the ionomer having from about 50 to 70 percent of the carboxylic acid groups neutralized with zinc, provided the composition has a notched Izod impact strength by ASTM D-256 at room temperature of at least 800 J/M, and further provided, component (a) and component (b) have moisture levels below 0.02 weight percent.

The weight percentages given for each of components (a) and (b) are based on the total of these components only.

Most preferred compositions of the present invention are semi-crystalline thermoplastic polyester moldable compositions consisting essentially of the following components:

(a) from about 80-85 weight percent of polyester resin, an (b) from about 15-20 weight percent of ionomer of about 67.5 weight percent ethylene, about 23.5 weight percent n-butyl acrylate, and about 9 weight percent methacrylic acid, and further wherein the ionomer having 70 percent of the methacrylic acid neutralized with zinc, provided the composition has a notched Izod impact strength by ASTM D-256 at room temperature of at least 800 J/M, and further provided, component (a) and component (b) have moisture levels below 0.02 weight percent.

Moreover, a preferred toughness level notched izod, for the compositions of the present invention is at least 960 J/M according to ASTM D-256 at room temperatures Component (a) is a polyester having a sufficiently high molecular weight to provide some o toughness to molded articles. In particular, the molecular weight should be high enough to provide a toughness of the polyester by itself of at least about 15 J/m and preferably at least about 30 J/m. The polyester is, in general, linear saturated condensation products of glycols and dicarboxylic acids, or reactive derivatives thereof. Preferably, they will comprise condensation products of aromatic dicarboxylic acids having 8 to 14 carbon atoms and at least one glycol selected from the group consisting of neopentyl glycol, cyclohexane dimethanol and aliphatic glycols of the formula $HO(CH_2)_nOH$ where n is an integer of 2 to 10. Up to 50 mole percent of the aromatic dicarboxylic acids can be replaced by at least one different aromatic dicarboxylic acid having from 8 to 14 carbon atoms, and/or up to 20 mole percent can be replaced by an aliphatic dicarboxylic acid having from 2 to 12 carbon atoms.

Preferred polyesters include; polyethylene terephthalate; poly(1,4-butylene) terephthalate; and 1,4-cyclohexylene dimethylene terephthalate/isophthalate copolymer and other linear homopolymer esters derived from aromatic dicarboxylic acids, including isophthalic acid, bibenzoic acid, naphthalene-dicarboxylic acid including the 1,5-; 2,6-; and 2,7-naphthalene-dicarboxylic acids; 4,4,-diphenylene-dicarboxylic acid; bis(p-carboxyphenyl) methane acid; ethylene-bis-p-benzoic acid; 1,4-tetramethylene bis(p-oxybenzoic) acid; ethylene bis(p-oxybenzoic) acid; 1,3-trimethylene bis(p-oxybenzoic) acid; and 1,4-tetramethylene bis(p-oxybenzoic) acid, and glycols selected from the group consisting of 2,2-dimethyl-1,3-propane diol; cyclohexane dimethanol an aliphatic glycols of the general formula $HO(CH_2)_nOH$ where n is an integer from 2 to 10, e.g., ethylene glycol; 1,4-tetramethylene glycol; 1,6-hexamethylene glycol; 1,8-octamethylene glycol; 1,10-decamethylene glycol; and 1,3-propylene glycol. Up to 20 mole percent, as indicated above, of one or more aliphatic acids, including adipic, sebacic, azelaic, dodecanedioic acid or 1,4-cyclohexanedicarboxylic acid can be present.

The polyester can be virgin, scrap, or recycle resin. Recycled polyester flake and polyethylene terephthalate are most preferred. Polyethylene terephthalate having an inherent viscosity of at least 0.55 dl/g is preferred and of at least 0.70 dl/g is most preferred.

It should be noted from above the term recycle polyester flake also includes recycle bottle flake.

The most common polyester molding compositions are based on polyethylene terephthalate homopolymers, polybutylene terephthalate homopolymers, polyethylene terephthalate/polybutylene terephthalate copolymers, polyethylene terephthalate/polybutylene terephthalate blends and mixtures thereof, although other polyesters can be used as well, alone, in combination with each other, or in combination with those polyesters listed above.

The inherent viscosity of the polyesters is measured at a concentration of 0.32 g/100 ml in trifluoroacetic acid (25 weight percent)/methylene chloride (75 weight percent) at 25-±0.10° C. It is computed by the formula $$\text{Inherent viscosity} = \frac{\text{natural log} \frac{\text{elution time of solution}}{\text{elution of solvent}}}{C}$$

where C is the concentration expressed in grams of polymer per 100 ml of solution.

Component (b), the ionomer, is prepared as described in U.S. Pat. No. 4,690,981 and which is hereby incorporated by reference.

These ionomers are copolymers of ethylene, unsaturated carboxylic acid and at least one softening copolymer that is copolymerizable with ethylene and gives a homopolymer having low glass transition temperature, the copolymer being partially neutralized with zinc, cobalt, nickel, aluminum or copper II with zinc being preferred.

The unsaturated acid can be selected from the group consisting of acrylic acid, methacrylic acid, maleic acid, fumaric acid and itaconic acid, and the half esters of maleic, fumaric and itaconic acid. The preferred acids are methacrylic acid and acrylic acid, with methacrylic acid being most preferred.

The softening comonomer should be an alkyl acrylate, the homopolymer of which has a glass transition temperature lower than −24° C. to about −80° C. preferably less than −40° C. and most preferably less than −50° C. Glass transition temperatures of those homopolymers can be selected by reference to "The Glass Transition Temperature of Polymers" section of the Polymer Handbook, Second Edition J. Brandrup & E. H. Immergut, etc., J. Wiley and Sons, New York. 1975, the disclosure of which is hereby incorporated by reference. The softening comonomer can be an alkyl acrylate such as n-hexyl-, n-butyl-, n-octyl-, 2-ethylhexyl-, and 2-methoxyethyl-acrylates. The preferred alkyl acrylates are n-butyl-, 2-ethylhexyl-, and 2-methoxyethyl-acrylates, all of which have a homopolymer Tg of less than −24° C. The most preferred alkyl acrylate is n-butyl acrylate. By way of contrast, iso-butyl acrylate's homopolymer has a Tg of −24° C.

The ionomer of the present invention has from about 20 to about 80 percent of the carboxylic acid groups neutralized with zinc, cobalt, nickel, aluminum or copper (II). Preferably the ionomer has from about 50 to about 70 percent of the carboxylic acid groups neutralized with zinc and most preferably about 70 percent.

The compositions of the present invention may be made from a single polyester resin and a single ionomer or from a mixture of polyester resins and/or ionomers.

The melt fabricated compositions of the present invention are characterized by extraordinary toughness. More specifically, it has been found that when certain ionomers, disclosed herein, are blended into a polyester resin, component (a), such that the ionomer is dispersed throughout the polyester as discrete particles, which particles have a number average particle size of less than 3 micrometers, then such compositions possess extraordinary toughness. The procedure for the measurement of the number average particle size is disclosed in U.S. Pat. No. 4,753,980 granted Jun. 28, 1988 to Deyrup, which disclosure is hereby incorporated by reference.

The compositions of the present invention may contain minor amounts of a variety of additives which are frequently used in plastics. Such additives include glass, graphite or aramid fibers, glass beads, clays, pigments (organic and inorganic), aluminum silicate, asbestos, mica, calcium carbonate, talc and the like, dyes, processing aids, waxes, silicones, flame retardants, mold release agents, antioxidants, ultraviolet absorbers/stabilizers, carbon black and combinations of such materials. Antioxidants, mold release agents and processing aids are usually added.

The compositions of the present invention can be used in precompounding or direct fabrication melt processes. In precompounding, the polyester and ionomer components are intensely mixed together in the molten state and isolated as a solid intermediate particulate form, typically as pellets. The precompounded intermediate particulates can then be subsequently further melt processed to produce articles by, for example, extrusion or molding.

In direct fabrication, a physical blend of the solid state polyester and ionomer components is fed directly to the melt process step in which articles are fabricated. The physical blend is typically produced by tumbling pellets of the components together in proportions needed to obtain the desired composition. No chemical reaction takes place in the physical blend. The article can be melt fabricated by continuous shear melt processing, such as for example, extrusion. Direct fabrication is advantageously applied to processes in which the melt is subjected to intermittently applied shear, such as for example, in injection molding. Direct fabrication thus can eliminate a costly precompounding process step. In order to avoid degradation so as to obtain excellent toughness levels of these compositions, the polyester resin and the ionomer may have moisture levels below 0.02 weight percent. The precompounded compositions may also have moisture levels below 0.02 weight percent for components (a) and (b).

The procedure used to determine moisture levels in component (a), the polyester resin, and component (b), the ionomer, is as follows. Moisture level is determined by the evaporative weight loss method by precisely weighing an approximately 2.5 g sample immediately prior to and following drying at 150° C. for 10.0 minutes, the weight percent moisture being calculated as the difference in weight measurements, i.e., weight lost, divided by final sample weight, multiplied by 100. This procedure may be facilitated by use of the "Aquastar" Model C1000 titrator moisture analyzer product of EM Science.

When using the direct fabrication technique with cyclic melt intermittent shear processes, the melt processing machine is typically equipped with a screw containing a dispersion head. A well known dispersion head is the Maddock configuration as described in U.S. Pat. Nos. 3,730,492 and 3,756,574 to Maddock including later modifications which eliminate the internal passages. Another dispersion head which was used in the Examples of Tables II and III, is described in detail hereinafter. In addition, in order to obtain the proper morphology and therefore toughness of the molding composition, the time of shearing or of the molding composition within the direct fabrication melt processing machine should be sufficient to disperse the ionomer to fine particle size within the polyester. In injection molding, time of shearing, hereinafter referred to as "mix time", is equal to the screw retraction period of the molding cycle, which is the part of the cycle in which the screw turns. In general, the longer time the screw turns and the higher the screw speed the better the dispersion. At constant screw rotation speed, duration of the screw retraction period can be controlled by application of "back pressure" opposing the rearward motion of the screw driven by the melt accumulating at the nozzle end of the screw. High back pressure provides greater opposing force, extends the retraction period, increases mix time as fraction of total cycle time, and improves dispersion.

Direct fabrication may be simply defined as (1) combining particles of a polyester resin with particles of ionomer, the particles having at least one dimension of at least 2 mm,
(2) melting this combination of particles while mixing them together,
(3) shearing the resultant melt without degrading the resins therein to disperse the melt of the ionomer within the melt of the polyester resin, the shear rate and shear time of this shearing step being effective to result in a number average particle size of the ionomer in articles fabricated from the resultant melt of less than about 3 micrometers,
(4) forcing of the resultant sheared melt into a pre-determined shape to obtain as a result thereof said article of said pre-determined shape directly fabricated from the combined particles.

In processes in which the screw rotation time and thus shear time is only intermittent rather than continuous as in extrusion, the shearing and forcing steps will be periodic. In injection molding machines these steps will alternate with one another while in extrusion blow molding, they will occur simultaneously.

The molding compositions of the present invention can be molded into semi-finished and finished articles by such processes as compression molding, injection molding extrusion, extrusion blow molding, rotational molding, melt spinning and stamping.

The resultant product is the toughened multi-phase polyester composition of this invention and may be used for a variety of applications for example, large industrial pails, consumer paint cans, food jars, automotive parts, storage crates for parts, solvent containers and the like.

TABLES AND EXAMPLES

In Table I below, the identification of components (a) and (b) and (c) are given. Components (a) and (b) in the Examples were flake and granules, respectively, and had at least one dimension of greater than 2 mm in length.

In the following Examples in Table II, III and IV, below, all percentages of component (a) and component (b) are given by weight. The amounts of component (c), additives, other than components (a) and (b) are given in weight based on the total weight of components (a) and (b). All values originally obtained in British units have been converted to S.I. units and rounded, where appropriate.

In addition, the Notched Izod Impact at room temperature was measured for each Example according to ASTM Procedure D-256. Notched Izod impact tests were carried out on flex bars. The flex bar is cut into two 31.75 mm long specimens.

After testing, the impact strength was recorded and the part of the bar tested was indicated with the test result. The standard flex bar was injection molded via a gate at one end of the bar. Because of this gate at one end of the bar, the bar was not morphologically homogeneous across its entire length.

The mold used for the present application produced two flex bars. Each shot therefore made two bars which can result in four notched Izod determinations.

The data for the direct fabrication in Tables II and III are the average of 12 tests, 6 at the gate end of the bar and 6 at the far end of the bar away from the gate. The impact strengths of the precompounded compositions in Table IV are the average of only 6 impact tests, 3 at the gate end of the bar and 3 at the far end of the bar away from the gate.

The standard deviations for the impact strengths of both the direct fabrications and the precompounded moldings between the near and far end of the bar were very low. However, there was greater variation in the direct fabrications from shot to shot than there was for the precompounded moldings. Thus, the reason for testing a greater number of samples.

In the following Examples, in Table II and III, the various Examples were prepared by direct fabrication.

The equipment used was a 168 g (6 oz) HPM injection molding machine using a 4.45 cm (1.75 in) diameter screw with a dispersion head.

The dispersion head is positioned at the downstream end of a conventional screw head for melt processing. The dispersion head receives molten composition and shears it sufficiently to provide the morphology and toughness desired for articles fabricated therefrom. The special dispersion head configuration used in the Examples in Tables II and III had three shearing sections spaced apart from one another along the length of the screw for receiving the molten resin, each shearing section consisting of (1) six bearing flights, and six barrier flights each extending from the screw, the bearing flights and the barrier flights extending at a 60° helix angle (helix angle measured from a line drawn perpendicular to the screw axis) along the screw, with the barrier flights having a smaller diameter than the diameter of said bearing flights so as to form a small spill clearance of 0.15 mm between the wall of the chamber and the barrier flights, said bearing and barrier flights being interleaved with one another to form twelve channels extending helically along said axis and each the channels having an entrance end and an exit end,
(2) the entrance end of every other channel being closed to prevent entry of the molten resin via the entrance end thereof,
(3) the exit end of the remaining channels being closed to prevent exit of the molten resin from the exit end thereof, the channels thereby forming six exit channels and six entry channels, respectively, the bearing flights and the barrier flights forming the fore and aft flights, respectively of the entry channels with respect to the direction of rotation of the screw, the closure of the exit end of the entry channels having the effect of forcing the molten resin from the entry channels to pass through the small clearance between the barrier flights and the barrel, the clearance being small enough to cause shearing of the compositions during passage therethrough to disperse the ionomer into finer and finer particles within the molten matrix of the polyester resin, component (a),
(4) and a transverse channel between each shearing section, mixing the exiting streams of molten dispersion with one another for advancement of the resultant mixture to the next shearing section, whereby the six exit streams of molten dispersion of each preceding section is re-distributed to the six entry streams of each subsequent section. This dispersion head of the special screw gives the fine dispersion of ionomer in polyester to give the toughened multi-phase compositions described in the Examples in Tables II and III.

The resultant particle size of the ionomer depends on the shear rate and the mixing time. The shear rate is determined by the diameter of the screw, the screw speed, and the spill clearance. The spill clearance is the distance between the top of the barrier flights and the extruder barrel wall. The larger the diameter of the screw and the faster the speed of the screw, the finer the particle size of the dispersed ionomer for a given spill clearance. The higher the shear rate, the lower the mixing time required to obtain the desired small particle size of the ionomer.

The injection molding conditions used in the Examples of Table II and III are as follows:

| Temperatures - | |
| --- | --- |
| barrel rear | 175° C. |
| barrel center | 260° C. |
| barrel front | 260° C. |
| nozzle front | 260° C. |
| Screw Speed | 100 rpm |
| Ram Speed | Fast |
| Mold Temperature | 40° C. |

The total injection molding cycle times of 43 seconds and 53 seconds were used with injection/hold times of 20/20 seconds and 20/30 seconds, respectively. Injection pressures of 3.45–5.52 MPa (500–800 psi) and a fast Ram speed were used to produce two 0.318 cm (⅛ inch) flex bars which have dimensions of 0.318 cm thick, 1.27 cm wide and 12.7 cm long and one 0.318 cm plaque which has dimensions of 0.318 cm thick, 7.62 cm wide and 12.7 cm long.

Components (a) and (b) in Tables II and III were vacuum dried in an oven overnight. The polyester, component (a), was dried at 100° C. and the ionomer, component (b), was dried at 40° C. Components (a) and (b) were then mixed together by drum-tumbling under nitrogen atmosphere.

In the remaining Examples which are in Table IV, below, the compositions were pre-compounded using a 28 mm twin screw extruder with a screw configuration that provides high degree of shear mixing which includes kneading blocks and reverse bushings.

Components (a) and (b) in the Examples in Table IV were vacuum dried in an oven overnight at 100° C. and 40° C., respectively. Components (a) and (b) were then mixed together by drum-tumbling under nitrogen atmosphere.

The compositions in Table IV were extruded at a rate of 6.81 kg/hr (15 lbs/hr) at a melt temperature of about 285°–290° C. The screw speed was 125 rpm and the temperature settings of the rear zone, center zone, front zone and die were 255° C., 267° C., 268° C. and 260° C., respectively. The extruded strand was cooled in water and pelletized. The pelletized compositions were then vacuum dried at 100° C. overnight and injection molded using a 168 g (6 oz) HPM injection molding machine using a general purpose screw at 60 rpm into two 0.318 cm (⅛ in) flex bars and a 0.318 cm × 7.62 cm × 12.7 cm (⅛ in × 3 in × 5 in) plaque. The injection molding conditions were as follows:

| Barrel and Nozzle Temp | 260° C. |
| --- | --- |
| Mold Temp | 40° C. |
| Cycle Time | 20 sec injection/20 sec hold/3 sec mold open |
| Overall Cycle Time | 43 sec |

Table IV were flake and molding granules, respectively, and had at least one dimension of greater than 2 mm in length. In addition, in Examples 4-1 and 4-2, component (b) is dispersed throughout component (a) as separate particles having a number average particle size of less than 3 micrometers.

DESCRIPTION OF RESULTS

Examples 2-1 through 2-7 in Table II illustrate direct fabrication of polyester molding compositions with varying degrees of back pressure. In Examples 2-1, 2-3, 2-4, 2-6 and 2-7, back pressures of from 2.07 to 3.45 Mpa were employed. As a result, mix times were high. Consequently, the ionomer is sufficiently dispersed within the polyester to provide notched Izod toughness results in excess of 800 J/M. Notched Izod results are most improved in Examples 2-3 and 2-6 of which mix time as percent of total cycle time are the highest.

Examples 2-2 and 2-5 are Comparative Examples, because the ionomer is not sufficiently dispersed in the polyester, and consequently notched Izod results for these examples are less than 800 J/M. The particle size of the ionomer in these Comparative Examples would be greater than 3 micrometers.

Examples 2-1, 2-3, 2-4, 2-6, and 2-7 have both high back pressure and a high mix time thus; excellent notched Izods can be seen.

Examples 3-1 through 3-5 in Table III illustrate Comparative Examples which contain an iso-butyl acrylate in the ionomer instead of n-butyl acrylate. It can be seen that all of the Examples have a notched Izod value of significantly less than 800 J/M, which is outside the claims of the present invention, and thus are not as tough compositions.

Examples 4-1 through 4-6 in Table IV illustrate the compositions which are pre-compounded with various ionomers, component (b).

Example 4-1 illustrates a composition of the present invention. Compare Examples 4-1 to Comparative Example 4-2. Comparative Example 4-2 has the same ionomer, however, the ionomer in Example 4-2 is outside the range of the compositions of the present invention. It can be seen that in Comparative Example 4-2 the notched Izod is significantly less than 800 J/M, namely 87.5 J/M.

Compare Example 4-1 to Comparative Examples 4-3 and 4-4. Examples 4-3 and 4-4 both contain ionomers not conforming to the present invention. Example 4-3 is made from an ionomer containing iso-butyl acrylate softening comonomer, and Example 4-4 contains an ionomer which is neutralized with sodium instead of zinc. The notched Izod value is much higher for Example 4-1 which contains the E/nBA/MAA.

In Example 4-5 the composition contains an unneutralized ionomer which has much lower toughness than does Example 4-1 which contains the same ionomer, however, the ionomer in Example 4-1 was neutralized with zinc.

Example 4-6 is a Comparative Example which is toughened by a high performance, non-ionomeric toughening agent. Comparing Example 4-1 to Example 4-6 illustrates the surprising toughness of the composition of the present invention as compared with another toughening agent.

In comparing the notched Izod values of Table II, Examples 2-i and 2-3 to Table IV, Example 4-1, it can be seen that direct fabrication produces as good toughness as the precompounded Example in Table IV thus, creating a savings by eliminating the precompounding step.

TABLE I

Identification of Components (a), (b) and (c)

| Code | Description |
|---|---|
| | Component (a) - Polyester |
| A | Recycle soda bottle flake having an inherent viscosity (IV) of 0.72 dl/g. |
| | Component (b) - Ethylene Copolymers |
| A | A zinc neutralized 67.5% ethylene/23.5% n-butyl acrylate/9% methacrylic acid (67.5% E/23.5% nBA) 9% MAA) copolymer about 70% neutralized with zinc ions |
| B | A zinc neutralized 80% ethylene/10% iso-butyl acrylate/10% methacrylate acid (80% E/10% iBA/10% MAA) copolymer 70% neutralized with zinc |
| C | A sodium neutralized 67.5% E/23.5% nBA/9% MAA copolymer 50% neutralized with sodium |
| D | A base resin 67.5% E/23.5% nBA/9% MAA copolymer |
| E | A 66.75% ethylene/28% n-butyl acrylate/5.25% glycidyl methacrylate (66.75% E/28% nBA 5.25% GMA) copolymer |
| | Component (c) - Additives |
| A | An antioxidant which is tetrakis[methylene(3 5,-di-tert-butyl-p-hydroxy-cinnamate]methane |
| B | a polar low molecular weight polyethylene having a viscosity at 120° C. of 350 MPa · SEC, a density of 0.94–0.96 g/cm$^3$, a saponification value of 30–45 mgKOH/gm and an acid value of 15-19 mgKOH/gm |

TABLE II

Impact Strength of Polyester Compositions Produced by a Direct Fabrication Process

| Example | Comp (a) (%) | ID Comp (b) | Comp (b) (%) | ID Comp (c) | Comp (c) (%) | Back Pressures (MPa) | Mix Time (sec) | Total Cycle (sec) | Mix Time Total Time (%) | Notched Izod J/m |
|---|---|---|---|---|---|---|---|---|---|---|
| 2-1 | 85 | A | 15 | A | 0.5 | 2.07 | 18.6 | 43 | 43.3 | 1243.5 |
| 2-2* | 85 | A | 15 | A | 0.5 | 0.35 | 12.4 | 43 | 28.8 | 586.7 |
| 2-3 | 85 | A | 15 | A | 0.5 | 2.97 | 25.2 | 53 | 47.5 | 1248.9 |
| 2-4 | 85 | A | 15 | A | 0.5 | 2.14 | 20.9 | 48 | 43.5 | 944.6 |
| 2-5* | 85 | A | 15 | A | 0.5 | 0.35 | 8.3 | 43 | 19.3 | 475.0 |
| 2-6 | 85 | A | 15 | A | 0.5 | 3.45 | 27.7 | 53 | 52.2 | 1184.8 |
| 2-7 | 85 | A | 15 | A | 0.5 | 1.52 | 17.3 | 43 | 40.2 | 1051.4 |

*Comparative Examples

TABLE III

Impact Strength of Comparative Polyester Compositions Produced by a Direct Fabrication Process

| Example | Comp (a) (%) | ID Comp (b) | Comp (b) (%) | ID Comp (c) | Comp (c) (%) | Back Pressures (MPa) | Mix Time (sec) | Total Cycle (sec) | Mix Time Total Time (%) | Notched Izod J/m |
|---|---|---|---|---|---|---|---|---|---|---|
| 3-1 | 85 | B | 15 | A | 0.5 | 1.90 | 18.0 | 43 | 41.9 | 74.2 |
| 3-2 | 85 | B | 15 | A | 0.5 | 2.76 | 25.0 | 53 | 24.2 | 88.6 |
| 3-3 | 85 | B | 15 | A | 0.5 | 0.035 | 13.5 | 43 | 31.4 | 69.4 |
| 3-4 | 85 | B | 15 | A | 0.5 | 0.035 | 14.6 | 43 | 34.0 | 82.7 |
| 3-5 | 85 | B | 15 | A | 0.5 | 3.00 | 21.2 | 53 | 39.8 | 560.4 |

TABLE IV

Comparison of Impact Strength of Pre-Compounded Polyester Compositions

| Example | Comp (a) (%) | ID Comp (b) | Comp (b) (%) | ID Comp (c) | Comp (c) (%) | ID Comp (c) | Comp (c) (%) | Notched Izod Impact (J/m) Far From Gate | Near Gate | Average |
|---|---|---|---|---|---|---|---|---|---|---|
| 4-1 | 85 | A | 15 | A | 0.5 | B | 0.5 | 1281.9 | 1462.3 | 1376.6 |
| 4-2* | 86.5 | A | 12.5 | A | 0.5 | B | 0.5 | 92.3 | 82.2 | 87.5 |
| 4-3* | 85 | C | 15 | A | 0.5 | B | 0.5 | 64.6 | 87.5 | 75.9 |
| 4-4* | 85 | B | 15 | A | 0.5 | B | 0.5 | 168.1 | 224.7 | 196.4 |
| 4-5* | 85 | D | 15 | A | 0.5 | B | 0.5 | 100.3 | 127.0 | 125.4 |
| 4-6* | 85 | E | 15 | A | 0.5 | B | 0.5 | 955.3 | 1131.4 | 1046.1 |

*Comparative Examples

I claim:

1. A process for directly fabricating a toughened, multi-phase article comprising a polyester and an ionomer, said process comprising the steps of:
(1) combining:
 (A) about 60–85 weight parts polyester; and
 (B) a complementary amount of ionomer to total 100 weight parts polyester and ionomer, said ionomer being further defined as:
  (a) being the polymerization product of:
   (i) at least 55 weight parts ethylene,
   (ii) about 20–30 weight parts alkyl acrylate softening comonomer having a homopolymer glass transition temperature lower than −24° C., and
   (iii) about 5–15 weight parts unsaturated carboxylic acid selected from the group consisting of acrylic acid, methacrylic acid, fumaric acid, itaconic acid, and half esters of maleic acid, fumaric acid and itaconic acid;
  (b) having about 20–80 mole percent of the carboxylic acid groups neutralized with zinc, cobalt, nickel, aluminum or copper (II), and
  (c) having a particle size in at least one dimension of at least 2 mm;
(2) melting and mixing the polyester and ionomer;
(3) intermittently and periodically shearing the resultant melt without degrading the polyester or the ionomer, thereby dispersing the ionomer within the polyester, using a shear rate and a shear time effective to provide a number average ionomer particle size of less than about 3 microns in a final fabricated article; and (4) periodically forcing the resultant sheared melt into a predetermined shape to obtain the article of predetermined shape, said article having a notched Izod impact strength at room temperature of at least 800 J/m; wherein steps (2)-(4) are conducted either.

(i) sequentially by injection molding or injection blow molding; or
(ii) simultaneously by blow molding or two-stage injection molding.

2. The process of claim 1, wherein steps (2)-(4) are conducted sequentially by injection molding or injection blow molding.

3. The process of claim 1, wherein steps (2)-(4) are conducted sequentially by blow molding or two-stage injection molding.

* * * * *